United States Patent
Long et al.

(10) Patent No.: US 10,587,116 B2
(45) Date of Patent: Mar. 10, 2020

(54) DISTRIBUTED POWER MANAGER

(71) Applicant: Galvion Soldier Power, LLC, Southborough, MA (US)

(72) Inventors: David N. Long, Northborough, MA (US); Richard Flathers, Southborough, MA (US); Gregory D. McConnell, Holden, MA (US); Nicholas J. Piela, Wilbraham, MA (US)

(73) Assignee: Galvion Soldier Power, LLC, Southborough, MA (US)

( * ) Notice: Subject to any disclaimer, the term of this patent is extended or adjusted under 35 U.S.C. 154(b) by 36 days.

(21) Appl. No.: 15/773,860

(22) PCT Filed: Nov. 18, 2016

(86) PCT No.: PCT/US2016/062863
§ 371 (c)(1),
(2) Date: May 4, 2018

(87) PCT Pub. No.: WO2017/087855
PCT Pub. Date: May 26, 2017

(65) Prior Publication Data
US 2019/0165575 A1    May 30, 2019

Related U.S. Application Data

(60) Provisional application No. 62/257,995, filed on Nov. 20, 2015.

(51) Int. Cl.
*G06F 1/26* (2006.01)
*H02J 1/10* (2006.01)
(Continued)

(52) U.S. Cl.
CPC .............. *H02J 1/102* (2013.01); *G06F 1/263* (2013.01); *G06F 1/266* (2013.01);
(Continued)

(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS 4,044,268 A    8/1977 Hammel et al.
4,589,075 A    5/1986 Buennagel
(Continued)

FOREIGN PATENT DOCUMENTS

EP         2230743        11/2013
WO      2006/126023      11/2006
(Continued)

OTHER PUBLICATIONS

Alibaba.com, 5KW charger controller for wind power supply and solar cell, 2009, 3 pages.
(Continued)

*Primary Examiner* — Zahid Choudhury
(74) *Attorney, Agent, or Firm* — Burns & Levinson, LLP; George N. Chaclas

(57) ABSTRACT

A distributed power network includes a power bus infrastructure distributed over a region with node points provided to interface with controllable power nodes. Each power node can be connected to an external power device such as a DC power source, a DC power load, or a rechargeable DC battery. The power nodes form a communication network and cooperate with each other to receive input power from DC power sources and or rechargeable DC batteries connected to the power bus infrastructure and distribute the power received therefrom to the power bus infrastructure for distribution to the DC power loads and to rechargeable DC batteries.

16 Claims, 5 Drawing Sheets

(51) Int. Cl.
*H02J 1/08* (2006.01)
*G06F 13/40* (2006.01)
*H02J 7/00* (2006.01)
*H02M 3/04* (2006.01)
*H02J 1/00* (2006.01)

(52) U.S. Cl.
CPC ............ *G06F 13/4022* (2013.01); *H02J 1/08* (2013.01); *H02J 7/0021* (2013.01); *H02J 7/0068* (2013.01); *H02M 3/04* (2013.01); *H02J 2001/008* (2013.01)

(58) Field of Classification Search
CPC ....... G06F 1/3289; G06F 1/266; H04L 12/12; H04L 12/10
See application file for complete search history.

(56) References Cited

U.S. PATENT DOCUMENTS

| | | | |
|---|---|---|---|
| 4,910,100 A | 3/1990 | Nakanishi et al. |
| 4,931,947 A | 6/1990 | Werth et al. |
| 5,153,496 A | 10/1992 | Laforge |
| 5,258,244 A | 11/1993 | Hall et al. |
| 5,321,349 A | 6/1994 | Chang |
| 5,570,002 A | 10/1996 | Castleman |
| 5,650,240 A | 7/1997 | Rogers |
| 5,675,754 A | 10/1997 | King et al. |
| 5,754,445 A | 5/1998 | Jouper et al. |
| 5,831,198 A | 11/1998 | Turley et al. |
| 5,898,291 A | 4/1999 | Hall |
| 5,903,764 A | 5/1999 | Shyr et al. |
| 5,914,585 A | 6/1999 | Grabon |
| 5,945,806 A | 8/1999 | Faulk |
| 5,977,656 A | 11/1999 | John |
| 5,986,437 A | 11/1999 | Lee |
| 6,014,013 A | 1/2000 | Suppanz et al. |
| 6,025,696 A | 2/2000 | Lenhart et al. |
| 6,046,514 A | 4/2000 | Rouillard et al. |
| 6,087,035 A | 7/2000 | Rogers et al. |
| 6,137,280 A | 10/2000 | Ackermann et al. |
| 6,198,642 B1 | 3/2001 | Kociecki |
| 6,221,522 B1 | 4/2001 | Zafred et al. |
| 6,246,215 B1 | 6/2001 | Popescu-Stanesti |
| 6,265,846 B1 | 7/2001 | Flechsig et al. |
| 6,271,646 B1 | 8/2001 | Evers et al. |
| 6,366,061 B1 | 4/2002 | Carley et al. |
| 6,366,333 B1 | 4/2002 | Yamamoto et al. |
| 6,370,050 B1 | 4/2002 | Peng et al. |
| 6,376,938 B1 | 4/2002 | Williams |
| 6,396,391 B1 | 5/2002 | Binder |
| 6,459,175 B1 | 10/2002 | Potega |
| 6,476,581 B2 | 11/2002 | Lew |
| 6,485,852 B1 | 11/2002 | Miller et al. |
| 6,492,050 B1 | 12/2002 | Sammes |
| 6,530,026 B1 | 3/2003 | Bard |
| 6,541,879 B1 | 4/2003 | Wright |
| 6,608,463 B1 | 8/2003 | Kelly et al. |
| 6,627,339 B2 | 9/2003 | Haltiner, Jr. |
| 6,628,011 B2 | 9/2003 | Droppo et al. |
| 6,633,823 B2 | 10/2003 | Bartone et al. |
| 6,690,585 B2 | 2/2004 | Betts-Lacroix |
| 6,694,270 B2 | 2/2004 | Hart |
| 6,703,722 B2 | 3/2004 | Christensen |
| 6,707,284 B2 | 3/2004 | Lanni |
| 6,828,695 B1 | 12/2004 | Hansen |
| 6,831,848 B2 | 12/2004 | Lanni |
| 6,925,361 B1 | 8/2005 | Sinnock |
| 6,985,799 B2 | 1/2006 | Zalesski |
| 7,001,682 B2 | 2/2006 | Haltiner, Jr. |
| 7,002,265 B2 | 2/2006 | Potega |
| 7,036,028 B2 | 4/2006 | Zalesski |
| 7,071,660 B2 | 7/2006 | Xu et al. |
| 7,076,592 B1 | 7/2006 | Ykema |
| 7,105,946 B2 | 9/2006 | Akiyama |
| 7,166,937 B2 | 1/2007 | Wilson et al. |
| 7,188,003 B2 | 3/2007 | Ransom et al. |
| 7,203,849 B2 | 4/2007 | Dove |
| 7,212,407 B2 | 5/2007 | Beihoff et al. |
| 7,226,681 B2 | 6/2007 | Florence et al. |
| 7,235,321 B2 | 6/2007 | Sarkar et al. |
| 7,243,243 B2 | 7/2007 | Gedeon |
| 7,256,516 B2 | 8/2007 | Buchanan et al. |
| 7,274,175 B2 | 9/2007 | Manolescu |
| 7,385,373 B2 | 6/2008 | Doruk et al. |
| 7,388,349 B2 | 6/2008 | Elder et al. |
| 7,408,794 B2 | 8/2008 | Su |
| 7,436,687 B2 | 10/2008 | Patel |
| 7,444,445 B2 | 10/2008 | Kubo et al. |
| 7,506,179 B2 | 3/2009 | Templeton |
| 7,531,915 B2 | 5/2009 | Wang et al. |
| 7,541,693 B2 | 6/2009 | Huang et al. |
| 7,618,260 B2 | 11/2009 | Daniel et al. |
| 7,646,107 B2 | 1/2010 | Smith |
| 7,674,543 B2 | 3/2010 | Chiang |
| 7,675,758 B2 | 3/2010 | Artusi et al. |
| 7,683,575 B2 | 3/2010 | Berdichevsky et al. |
| 7,701,082 B2 | 4/2010 | Lazarovich |
| 7,778,940 B2 | 8/2010 | Mazzarella |
| 7,808,122 B2 | 10/2010 | Menas et al. |
| 7,814,348 B2 | 10/2010 | Krajcovic et al. |
| 7,834,479 B2 | 11/2010 | Capp et al. |
| 7,838,142 B2 | 11/2010 | Scheucher |
| 7,844,370 B2 | 11/2010 | Pollack et al. |
| 7,847,532 B2 | 12/2010 | Potter et al. |
| 7,849,341 B2 | 12/2010 | Sugiyama |
| 7,855,528 B2 | 12/2010 | Lee |
| 7,928,720 B2 | 4/2011 | Wang |
| D640,192 S | 6/2011 | Robinson et al. |
| 8,073,554 B2 | 12/2011 | Vezza et al. |
| 8,086,281 B2 | 12/2011 | Rabu et al. |
| 8,103,892 B2 | 1/2012 | Krajcovic |
| 8,106,537 B2 | 1/2012 | Casey et al. |
| 8,138,631 B2 | 3/2012 | Allen et al. |
| 8,140,194 B2 | 3/2012 | Iino et al. |
| 8,164,217 B1 | 4/2012 | Miller |
| 8,178,999 B2 | 5/2012 | Burger et al. |
| 8,193,661 B2 | 6/2012 | Jagota et al. |
| 8,255,090 B2 | 8/2012 | Frader-Thompson et al. |
| 8,279,642 B2 | 10/2012 | Chapman et al. |
| 8,294,307 B2 | 10/2012 | Tsai |
| 8,304,122 B2 | 11/2012 | Poshusta et al. |
| 8,312,299 B2 | 11/2012 | Tremel et al. |
| 8,315,745 B2 | 11/2012 | Creed |
| 8,333,619 B2 | 12/2012 | Kondo et al. |
| 8,352,758 B2 | 1/2013 | Atkins et al. |
| 8,375,229 B2 | 2/2013 | Saeki |
| 8,401,709 B2 | 3/2013 | Cherian et al. |
| 8,447,435 B1 | 5/2013 | Miller et al. |
| 8,455,794 B2 | 6/2013 | Vogel |
| 8,466,662 B2 | 6/2013 | Nania et al. |
| 8,476,581 B2 | 7/2013 | Babayoff et al. |
| 8,494,479 B2 | 7/2013 | Budampati et al. |
| 8,508,166 B2 | 8/2013 | Marcinkiewicz et al. |
| 8,548,607 B1 | 10/2013 | Belz et al. |
| 8,599,588 B2 | 12/2013 | Adest et al. |
| 8,611,107 B2 | 12/2013 | Chapman et al. |
| 8,614,023 B2 | 12/2013 | Poshusta et al. |
| 8,633,619 B2 | 1/2014 | Robinson et al. |
| 8,638,011 B2 | 1/2014 | Robinson et al. |
| 8,643,326 B2 | 2/2014 | Campanella et al. |
| 8,648,492 B2 | 2/2014 | Craig et al. |
| 8,649,914 B2 | 2/2014 | Miller et al. |
| 8,682,496 B2 | 3/2014 | Schweitzer, III et al. |
| D706,711 S | 6/2014 | Robinson et al. |
| 8,775,846 B2 | 7/2014 | Robinson et al. |
| 8,781,640 B1 | 7/2014 | Miller |
| 8,796,888 B2 | 8/2014 | Rice et al. |
| 8,829,713 B2 | 9/2014 | Ishigaki et al. |
| 8,849,471 B2 | 9/2014 | Daniel et al. |
| 8,853,891 B2 | 10/2014 | Soar |
| 8,854,389 B2 | 10/2014 | Wong et al. |
| 8,890,474 B2 | 11/2014 | Kim et al. |
| 8,901,774 B2 | 12/2014 | Yan et al. |

(56) References Cited

U.S. PATENT DOCUMENTS

| | | | |
|---|---|---|---|
| 8,913,406 B2 | 12/2014 | Guthrie et al. | |
| 8,970,176 B2 | 3/2015 | Ballatine et al. | |
| 9,041,349 B2 | 5/2015 | Bemmel et al. | |
| 9,043,617 B2* | 5/2015 | Miki | G06F 1/3203 713/300 |
| 9,093,862 B2 | 7/2015 | Dennis et al. | |
| 9,142,957 B2 | 9/2015 | Malmberg et al. | |
| 9,158,294 B2 | 10/2015 | Carralero et al. | |
| 9,190,673 B2 | 11/2015 | Venkataraman et al. | |
| 9,203,302 B2 | 12/2015 | Kelly | |
| 9,207,735 B2 | 12/2015 | Khaitan et al. | |
| 9,337,943 B2 | 5/2016 | Mosebrook et al. | |
| 9,343,758 B2 | 5/2016 | Poshusta et al. | |
| 9,450,274 B2 | 9/2016 | Vo et al. | |
| 9,452,475 B2 | 9/2016 | Armstrong et al. | |
| 9,502,894 B2 | 11/2016 | Holmberg et al. | |
| 9,634,491 B2 | 4/2017 | Robinson et al. | |
| 9,698,596 B2 | 7/2017 | Sauer et al. | |
| 9,722,435 B2 | 8/2017 | Park | |
| 2002/0135492 A1 | 9/2002 | Reagan et al. | |
| 2003/0006905 A1 | 1/2003 | Shieh et al. | |
| 2003/0054215 A1 | 3/2003 | Doshi et al. | |
| 2003/0234729 A1 | 12/2003 | Shen | |
| 2004/0061380 A1 | 4/2004 | Hann et al. | |
| 2004/0125618 A1 | 7/2004 | De Rooij et al. | |
| 2005/0037241 A1 | 2/2005 | Schneider et al. | |
| 2005/0275372 A1 | 12/2005 | Crowell | |
| 2006/0127725 A9 | 6/2006 | Sarkar et al. | |
| 2007/0078230 A1 | 4/2007 | Lai | |
| 2007/0141424 A1 | 6/2007 | Armstrong et al. | |
| 2007/0222301 A1 | 9/2007 | Fadell et al. | |
| 2008/0024007 A1 | 1/2008 | Budampati et al. | |
| 2008/0269953 A1* | 10/2008 | Steels | H02J 7/0004 700/295 |
| 2008/0305839 A1 | 12/2008 | Karaoguz et al. | |
| 2009/0079263 A1 | 3/2009 | Crumm et al. | |
| 2010/0001689 A1 | 1/2010 | Hultman et al. | |
| 2010/0280676 A1* | 11/2010 | Pabon | G06F 1/266 700/295 |
| 2011/0007491 A1* | 1/2011 | Robinson | G06F 1/263 361/810 |
| 2011/0184585 A1 | 7/2011 | Matsuda et al. | |
| 2011/0278957 A1 | 11/2011 | Eckhoff et al. | |
| 2012/0205976 A1 | 8/2012 | Shih et al. | |
| 2014/0091623 A1 | 4/2014 | Shippy et al. | |
| 2014/0095915 A1* | 4/2014 | Hitchcock | G06F 1/3212 713/323 |
| 2014/0292081 A1* | 10/2014 | Long | H02M 3/156 307/24 |
| 2016/0094071 A1* | 3/2016 | Nge | H02J 7/0052 320/107 |

FOREIGN PATENT DOCUMENTS

| | | |
|---|---|---|
| WO | 2007/012785 | 2/2007 |
| WO | 2007/048837 | 5/2007 |
| WO | 2007/076440 | 7/2007 |
| WO | 2008/072014 | 6/2008 |
| WO | 2008/072015 | 6/2008 |
| WO | 2008/090378 | 7/2008 |
| WO | 2011/023678 | 3/2011 |
| WO | 2011/046645 | 4/2011 |
| WO | 2011113280 | 9/2011 |
| WO | 2012/122315 | 9/2012 |
| WO | 2013/083296 | 6/2013 |
| WO | 2014/165469 | 10/2014 |

OTHER PUBLICATIONS

Amazon.com: Morningstar TriStar-45 Solar Charge Controller for solar/wind generator/Wind Turbine-45 amps, 2009, 6 pages.
Bruce et al.,www.rfdesign.com, Defense Electronics, Military takes aim at high battery costs, Apr. 2005, pp. 20-25.
F.H. Khan et al., ww.ietdl.org, IET Power Electronics, Bi-directional power manager management and fault tolerant feature in a −5kW multivlevel dc-dc converter with modular architecture, 2009, pp. 595-604, vol. 2, No. 5, 10 pages.
Fran Hoffart, New charger topology maximizes battery charging speed, 1998, 2 pages.
Green Plug, www.greenplug.us, One plug one planet, 2009, 7 pages.
greentmcnet.com/topics/green/articles/57729-green-plug-partners-with-wipower-advanced-wireless-power.htm, plug partners with wipower for advanced wireless power systems, 2009, 3 pages.
Greg Cipriano et al., Protonex, Joint Service Power Expo, 2009, 38 pages.
http://defense-update.com/products/b/ba5590.htm, BA 5590 Lithium Battery, Jul. 26, 2006, 1 page.
http://fuelcellsworks.com/news/2009/06/04/sfc-smart-fuel-cell-launches-joint-power-manager, SFC smart fuel cell launches joint power manager, Jun. 2009, 4 pages.
Ian C. Evans et al., IEEE electric ship technologies symposium, High power clean dc bus generation using ac-link ac to dc power voltage conversion, dc regulation, and galvanic isolation, 2009, 12 pages.
Inki Hong et al., IEEE Transactions on computer-aided design of integrated circuits and systems, Power Optimization of variable-voltage core-based systems, Dec. 1999, vol. 18, No. 12, 13 pages.
Jaber A. Abu et al., Twenty-Fourth Annual IEEE Applied Power Electronics Conference and Exposition, Control Scheme for high-efficiency high-performance two-stage power converters, 2009, 7 pages.
Jorge L. Duarte et al., IEEE Transactions on Power Electronics, Three-Port Bidirectional converter for hybrid fuel cell systems, 2007, vol. 22, No. 2, 8 pages.
Julio Garcia, 2009 Barcelona Forum on Ph.D. Reseach in Electronic Engineering, Efficiency improvements in autonomous electric vehicles using dynamic commutation of energy resources, 2009, 2 pages.
Karlsson et al., IEEE Transactions on power electronics, DC bus voltage control for a distributed power system, Nov. 2003, pp. 1405-1412, v: 18, n:6, 8 pages.
Leonid Fursin et al., Development of compact variable-voltage, bi-directional 100kw dc-dc converter, 2007, 9 pages.
M. Becherif et al., Vehicle power and propulsion conference (VPPC), 2010 IEEE, IEEE Power and Propulsion Conference (VPPC), Advantages of variable DC bus voltage for hybrid electrical vehicle, 201, pp. 1-6.
M. Conti et al., SystemC modeling of a dynamic power management architecture, 6 pages.
Mat Dirjish, http://electronicdesign.com/Articles/Index.cfm?AD=1&ArticlesID-19515; Enginner seeks cure for common wall warts, Aug. 2008, 3 pages.
Matthew Alan Merkle, Thesis submitted to the faculty of Virginia Polytechnic Institute and State UniversityVariable bus voltage modeling for series hybrid decide vehicle simulation, Dec. 1997, 33 pages.
Ocean Server Technology, Inc., Intelligent Battery and Power System, May 2008, 4 pages.
Ocean Server Technology, Inc., Smart Li-ion packs, integrated chargers, ultra high efficiency dc-dc converters, integrate battery power or backup, fully engineered (plug and run) and 95 to 25,000+ watt-hour clusters, 2007, 4 pages.
Peter Podesser, www.mil-embedded.com/articles/id/?3968, Portable power management for soldiers; Fuel cell hybrid system is lighter, safer, May 2009.
replay.waybackmachine.org/20090122152343/http://ww.sfc.com/en/about-sfc.html, About SFC Smart Fuel Cell, 1 page.
replay.waybackmachine.org/20090312005238/http://ww.sfc.com/en/man-portable-technology-power-manager.html, The SFC Power Manager—The Technology, 2009, 2 pages.
Reyneri et al., IAC-09.C3.2.8, A redundant power bus for distributed power management for a modular satellite, 2009, 8 pages.
Richter Wolfgang, Chip for saving power, Aug. 2007, 2 pages.
Robert M. Button, Nasa/TM-2002-211370, Intelligent Systems for Power Management and Distribution, Feb. 2002, 12 pages.

(56) References Cited

OTHER PUBLICATIONS

Singh et al, Conference Record of the Twenty-Eighth IEEE Photovoltaic Specialists Conference, Fuzzy Logic-based Solar Charge Controller for Microbatteries, 2000, pp. 172-1729.

Wilson Rothman, gizmodo.com/295076/new-Honeywell-hdmi-cable-heals-sell-but-at-what-cost, New Honeywell HDMI Cables Heals Self, But At What Cost?, Aug. 2007, 3 pages.

ww.sfc.com/index2.php option=com_pressreleasees&itemid=467&id=1050&lang=en&pop-1&page=0, SFC receives commercial order for portable fuel cells, 2008 1 page.

www.energyharvestingjournal.com/articles/soldier-worn-portable-power-management-system-00001375.asp?sessionid=1, Energy Harvesting Journal: Soldier-worn portable power management system, 2009, 2 pages.

www.mpoweruk.com/bms.htm.Battery Management Systems (BMS), 2009, 12 pages.

www.nkusa.com/prod-monitor-smart-cable.htm, Nihon Kohden: Products-Monitoring, Smart Cable Technology, 1 page.

www.paneltronics.com/ip.asp?op=Multiplex%20Distributions%20Systems. Paneltronics, What is Power Sign?, 2006, 2 pages.

www.reuters.com/article/pressRelease/idUS159777+17-Feb-2009+BW20090217, Reuters. Protonex to Launch Soldier-Worn Portable Power Management Systems, Feb. 2009, 3 pages.

www.sfc.com, About SFC Smart Fuel Cell, 2019, 1 page.

International Search Report and Written Opinion for International Application No. PCT/US2016/058922, dated Feb. 9, 2017, 6 pages.

International Search Report and Written Opinion for International Application PCT/US2016/062883 dated Mar. 30, 2017, 6 pages.

European Search Report for European Patent Application No. 16866830.9 dated Mar. 1, 2019, 9 pages.

\* cited by examiner

Power Bus

Communication Bus able DC batteries.

DISTRIBUTED POWER MANAGER

CROSS REFERENCE TO RELATED APPLICATIONS

This application claims the benefit of and is a U.S. national phase, pursuant to 35 U.S.C. § 371, of International Patent Application No. PCT/US2016/062863, filed Nov. 18, 2016, which claimed the benefit of U.S. Provisional Application No. 62/257,995, filed Nov. 20, 2015. The entire contents of the above applications are incorporated herein in their entireties by this reference.

1 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright©, Protonex Technology Corp.

2 BACKGROUND OF THE INVENTION

2.1 Field of the Invention

The exemplary, illustrative, technology herein relates to systems, software, and methods of a distributed DC power network that includes a plurality of power nodes each operable to connect an external power device to a common power bus wherein each power node includes a digital data processor and a communication interface operable to receive power from a power source or rechargeable DC battery or deliver power to a power load or a rechargeable DC battery.

The technology herein has applications in the areas of DC power distribution and allocation and to recharge rechargeable DC batteries.

2.2 The Related Art: Centralized Power Management

Conventional power management control systems use a central data processor running an energy management schema program to pole power devices connected to a common power bus over a device port and to manage power distribution to and from the power bus. Conventional power managers usually operate the power bus with a fixed DC bus voltage and provide DC to DC power converters disposed between the power bus and the device ports. When an external power device is operable at the fixed DC bus voltage the power device is connected directly to the power bus without the need for power conversion.

The central data processor runs an energy management schema program operable to communicate with external DC power devices connected to device ports over a communication interface and to determine the external device type, i.e. DC power source, DC power load or rechargeable DC battery, operating characteristics such as a voltage range, a current range, power demand, battery State of Charge (SoC), or the like. Based on the collected information the energy management schema decides on a network configuration, connects external power devices to and disconnects external power devices from the power bus, and distributes any available input power to one or more connected power loads and or rechargeable DC batteries and in some operating modes a rechargeable battery can be used as an input power source. Examples of conventional portable DC power managers are disclosed in U.S. Pat. No. 8,775,846 entitled PORTABLE POWER MANAGER, in U.S. Pat. No. 8,638,011 entitled POWER MANAGER OPERATING METHODS, and in U.S. Pat. No. 8,333,619 entitled POWER MANAGERS AND METHODS FOR OPERATING POWER MANAGERS, all to Robinson et al. and all assigned to Protonex Technology Corp. of Southborough Mass.

While the example conventional power managers described above provide the desired power distribution characteristics, they each require that each external power device be tethered to a central power manager module by a different cable. This limits the spatial distribution of the external power devices to the length of the cables and the cables add weight to the overall power distribution network which is undesirable because the power managers are carried by infantry soldiers. Additionally because the example conventional power managers only include a limited number of device ports, the number of power devices usable by the power device manager is limited by the number of ports.

To solve the above described problems of conventional power managers, distributed power networks have been described without cable connections such as in U.S. Pat. No. 6,476,581 entitled, METHODS FOR MAKING APPAREL AND SENSOR COVERING WITH ENERGY CONVERTING, STORING AND SUPPLYING CAPABILITIES AND OTHER ELECTRICAL COMPONENTS INTEGRATED THEREIN, by Lew and in U.S. Pat. Appl. No. 20120007432 entitled, WEARABLE POWER MANAGEMENT SYSTEM by Rice et al. Both Lew and Rice disclose power devices connected to a common power bus without using a cable. While Lew describes a smart jacket that includes solar cells connected to a power bus or grid distributing power to rechargeable batteries and various sensor connected to the power grid, the disclosure mainly describes collecting sensor data rather than power distribution. Rice describes a distributed power bus worn by a user and a plurality of individual power management devices with each one disposed between an external power device and the power bus. Each power manager device includes a controller, a DC to DC power converter, and voltage and current sensors, and is operable to exchange power between the external device and the power bus. However, one problem with the power manager device disclosed by Rice is that it requires two DC to DC power converters, one to convert input power and one to convert output power, and this adds unnecessary weight and complexity to the overall system.

3 BRIEF DESCRIPTION OF THE DRAWINGS

The features of the present invention will best be understood from a detailed description of the invention and example embodiments thereof selected for the purposes of illustration and shown in the accompanying drawings in which.

4 DESCRIPTION OF SOME EMBODIMENTS OF THE INVENTION

4.1 Definitions

Figure 1:
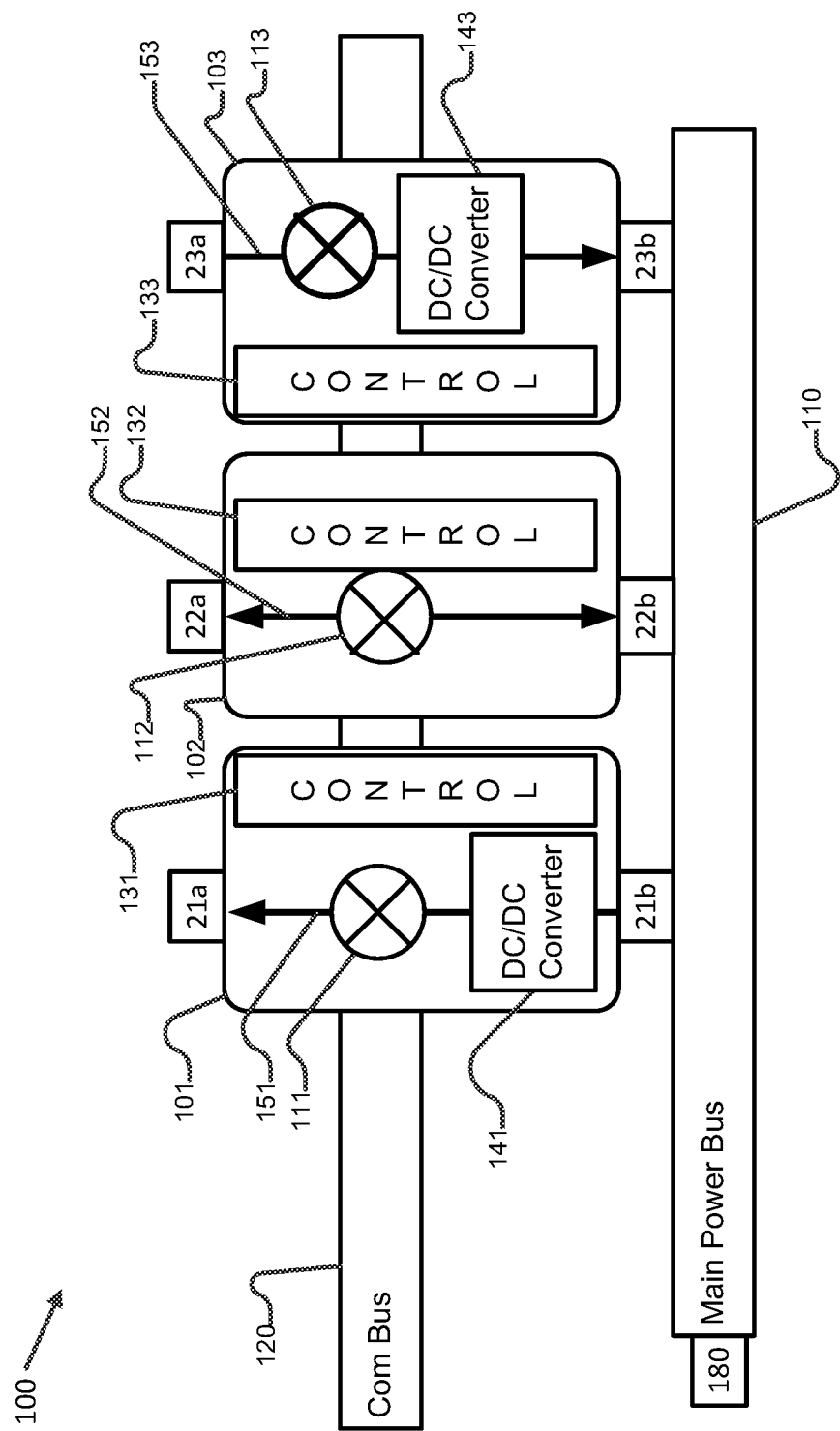
FIG. 1 depicts a schematic view of a non-limiting exemplary distributed power network according to the present invention.

The following definitions are used throughout, unless specifically indicated otherwise:

| TERM | DEFINITION |
|---|---|
| External Power Device | A DC power load, a DC power source, or a rechargeable DC battery. |
| Power Node | A controllable element disposed between a power bus infrastructure and an external power device at least operable to connect the external power device to the power bus or to disconnect the external power device from the power bus. |
| Bus Power Port | An electrical interface provided to electrically interface a power node to a power bus. |
| Device Power Port | An electrical interface provided to electrically interface an external power device to a power node. |
| Energy Management Schema | An energy management schema includes various programs, firmware algorithms, and policy elements operating on a digital data processor to receive input power into a power management network from one or more input ports and to distribute output to external power devices connected to one or more output ports. |

4.2 Item Number List

The following item numbers are used throughout, unless specifically indicated otherwise.

| # | DESCRIPTION | # | DESCRIPTION |
|---|---|---|---|
| 100 | Distributed power network | 300 | Universal power node |
| 21a | Device power port | 30a | Power device port |
| 22a | Device power port | 30b | Power bus port |
| 23a | Device power port | 311 | Controllable switch 1 |
| 21b | Bus power port | 312 | Controllable switch 2 |
| 22b | Bus power port | 313 | Controllable switch 3 |
| 23b | Bus power port | 314 | Controllable switch 4 |
| 101 | Output power node | 330 | Universal power node controller |
| 102 | Bus compatible power node | 340 | Controllable power converter |
| 103 | Input power node | 341 | Power converter input side |
| 110 | Power bus infrastructure | 342 | Power converter output side |
| 111 | Controllable switch | 351 | Two-way power channel |
| 112 | Controllable switch | 352 | Two-way power channel |
| 113 | Controllable switch | 353 | Two-way power channel |
| 120 | Communication network | 354 | One-way power channel |
| 131 | Local controller | 355 | One-way power channel |
| 132 | Local controller | 356 | Two-way power channel |
| 133 | Local controller | 357 | Two-way power channel |
| 141 | Output power converter | 358 | Two-way power channel |
| 143 | Input power converter | 360 | Universal power node battery |
| 151 | Power channel | | |
| 152 | Power channel | 400 | Distributed power network |
| 153 | Power channel | 31a | Power device port |
| 180 | Power bus battery | 31b | Power bus port |
| | | 32a | Power device port |
| 200 | Control infrastructure | 32b | Power bus port |
| 205 | Power node | 33a | Power device port |
| 210 | Power bus infrastructure | 33b | Power bus port |
| 215 | External power device | 405 | Combined power and communication infrastructure |
| 220 | Bus power port | 410 | Node point |
| 225 | Device power port | 450 | Power source |
| 230 | Power channel | 455 | Power load |
| 235 | DC to DC power converter | | |
| 240 | Digital data processor | 510 | Power bus infrastructure |
| 245 | Node memory module | 520 | Conductive pathways |
| 247 | Node battery | | |
| 250 | Node communication interface module | 610 | Communication network |
| 255 | Node communication channel | 620 | Conductive pathways |
| 260 | External communication interface device | | |
| 265 | Switch module | 710 | Combined power and communication infrastructure |
| 267 | External digital data processor | 720 | Node point |
| 270 | External communication channel | | |
| 275 | Network communication channel | | |
| 280 | External power element | | |
| 285 | External power channel | | |
| 290 | External memory module | | |
| 295 | Power sensor | | |

4.3 Exemplary System Architecture

4.3.1 Exemplary Distributed Power Management Network

Referring to FIG. 1, a schematic diagram of a first exemplary non-limiting embodiment of the present invention depicts a distributed power network (100). The distributed power network (100) includes a power bus infrastructure (110) extending over a region and a communication network (120). The power bus infrastructure (110) includes power distribution architecture such as a common power bus or electrical conductor, or logical overlays equivalent to a common power bus. The power bus infrastructure (110) is one or more interconnected conductive pathways provided to electrically interface with a plurality of external power devices in a manner that allows power to be received from or delivered to any external power device. Each external power device interfaces to the power bus infrastructure over a power node (101), (102), (103) which includes power control and communication elements. The control elements at least include a switch operable to connect or disconnect the external power device to the power bus infrastructure. The communication elements are operable to communicate with an external power device connected to the power node and with other power nodes.

In a non-limited exemplary embodiment the power bus infrastructure (110) comprises one or more wire pairs, or other conductive structures formed by two conductors that form a current carrying circuit disposed over a region. Alternately the power bus infrastructure may include an array of interconnected wire pairs or may comprise a cable harness having a plurality of node connection points. Ideally the power bus infrastructure (110) can be electrically interfaced with a power node (101, 102, 103) at any convenient locations that allow power nodes to be added or removed anywhere over the region covered by the power bus infrastructure. Alternately the power bus infrastructure is configured with a plurality of attachment points or power bus ports (21b, 22b, 23b) at fixed locations.

The distributed power network (100) includes a plurality of power nodes (101), (102), and (103). Each power node is electrically interfaced to the power bus infrastructure (110) over a bus power port (21b), (22b), (23b). The bus ports (21b, 22b, 23b) may be entirely associated with the power bus infrastructure (110), entirely associated with the power node infrastructure (101, 102, 103) or partially provided on the power bus infrastructure (110) and partially provided on the power node (101, 102, 103).

Each power node (101) (102) and (103) includes a device power port (21a) (22a) and (23a) provided to electrically interface with an external power device. The device power ports (21a, 22a, 23a) may be entirely associated with the power nodes (101, 102, 103), entirely associated with the external power device (215) or may be partially provided on the power node and partially provided on the external power device.

Each power node (101), (102) and (103) includes a digital data processor or the like running an energy management schema capable of performing various logical operations such as operating various control elements provided on the power node and communicating with connected external power devices and with outer power nodes. Each power node (101), (102) and (103) includes a communication interface device e.g. a network interface device operable to establish a communication network (120) that includes other power nodes and to exchange command and control signals and data with all other power nodes associated with the distributed power network (100).

Communication network (120) includes communication network infrastructure operable to interconnect each power node with each other power node wherein each power node also becomes a node of the communication network (120) so that all the power nodes can communicate with each other using a single network protocol. Alternately a power node may include a network protocol conversion module or may include multiple network interface devices each having a different network interface capability. The power node device configuration is preferably operable to establish a peer-to-peer network with every other power node in the distributed power network (100) and to communicate with other power nodes as peers. Communication network (120) embodiments may include a wireless network based on any one of the IEEE 802.11 Wireless Local Area Network (WLAN) protocols which include Wi-Fi, Bluetooth, or any one of the IEEE 802.11 WLAN protocols. Communication network (120) embodiments may also include a wired network infrastructure such as any one of the IEEE 802.3 wired Local Area Networks (LAN) protocols which include Ethernet and Power over Ethernet (PoE) or the Universal Serial Bus (USB) protocol which also provides a Power over USB option. In this case, each power node (101) (102) and (103) includes a network interface device operable to communicate with other network nodes over an over an IEEE 802.3 LAN protocol when the power nodes are interconnected by a wired communication network structure.

The power bus infrastructure (110) is configured to include a plurality of power device connection points or power bus ports (21b), (22b), (23b). Each power bus port is operable to electrically interface a power node (101) with the power bus infrastructure (110). Each power node (101, 102, 103) is electrically interfaced with an external power device (215) over a device power port (21a, 22a, 23a). Additionally each power node includes at least one network interface device (250) in communication with a local controller (131), (132), (133) (240) wherein the network interface is operable to provide communicate between the power node it is operating on and every other power node associated with the distributed power network (100) over communications network (120).

In a preferred operating mode the power bus infrastructure (110) has an operating voltage range wherein the operating voltage range is centered on a nominal fixed voltage. Generally the nominal fixed voltage is matched to an operating voltage of external power devices that are most likely to be managed by the power distribution network (100). In one example embodiment wherein the distributed power network operates in a 12-volt DC environment such as in an automobile of other vessel that includes a 12-volt power generating system and utilizes 12-volt rechargeable DC battery to store energy, the power bus infrastructure (110) has an operating voltage range that is centered around 12 volts DC. In other operating environments, e.g. where most devices that will be connected to the power distribution network have an operating voltage range centered at 48 volts DC, the power bus infrastructure (110) has an operating voltage range that is also centered around 48 volts DC. However, as will be described below, some power nodes include DC to DC voltage converters that can be used to power external devices or receive power from external power sources that can only operate over a non-bus-compatible voltage range.

Each power node (101), (102), and (103) includes a local controller (131), (132), (133) that includes a programmable logic device operating an energy management schema program and carrying out logical operations such as communicating with other logic devices, managing a memory module to store and recall data, reading sensor signals from power sensors, and operating control devices such switches, a DC to DC power converter, or the like.

Figure 2:
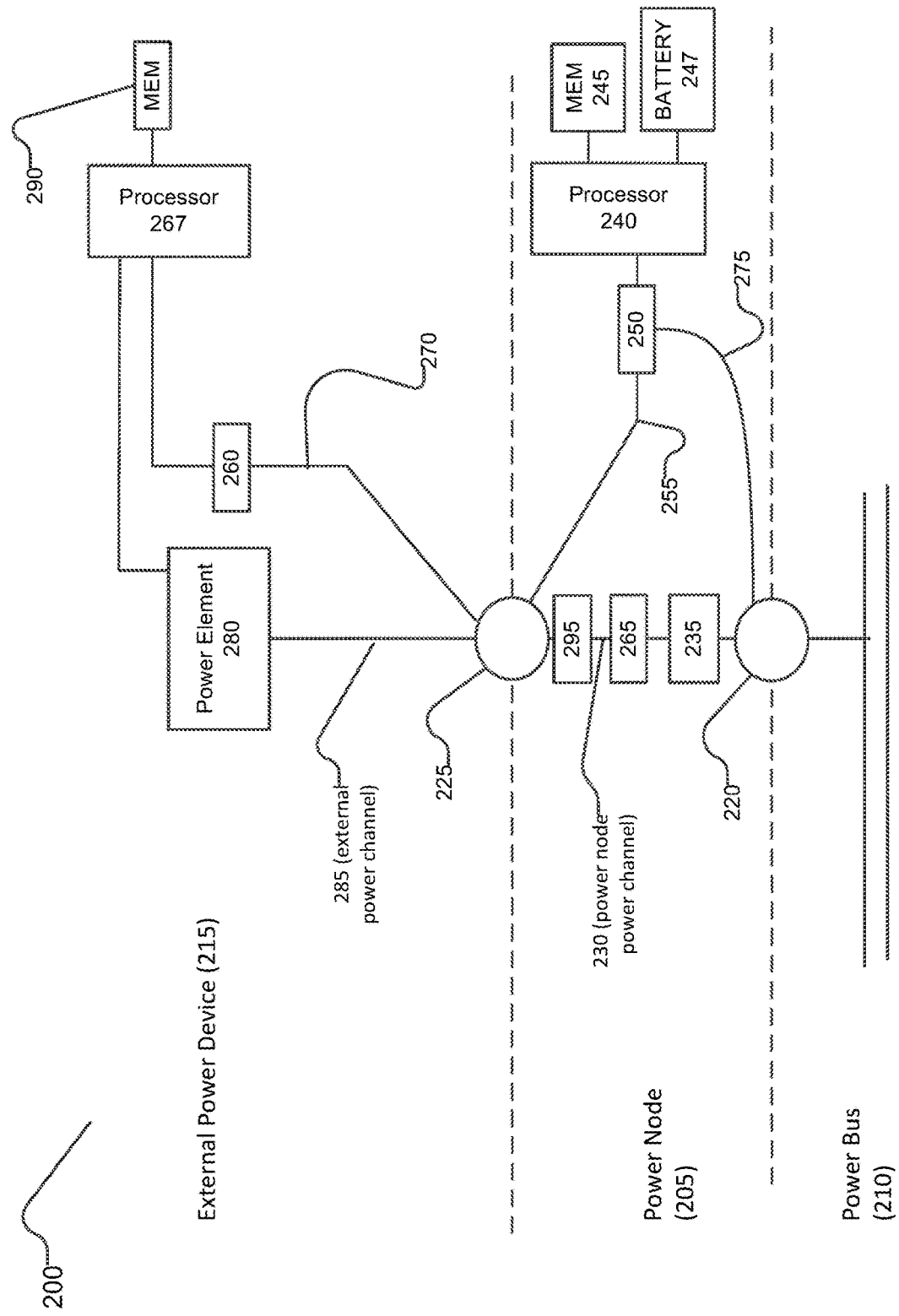
FIG. 2 depicts a schematic view of a non-limiting exemplary embodiment of control and communication elements of a power node connected between an external power device and the power bus infrastructure of the present invention.

Referring to FIG. 2, an exemplary control infrastructure (200) is shown schematically. The control infrastructure includes a power node (205) connected between the power bus infrastructure (210) and an external power device (215). The power node includes bus power port (220) and device power port (225) which are electrically interconnected by a power node power channel (230). A DC to DC power converter (235) is disposed along the power node power channel (230) between the device ports, unless the power node does not include a DC to DC power converter, as is the case with power node (102) shown in FIG. 1.

Each power node controller e.g. (131, 132, 133) includes a digital data processor (240), a memory module (245) and a node communication interface (250). A power node (205) can include an optional node battery (247). If present, the node battery (247) provides power to the digital data processor (240). The memory module and node communication interface are each in communication with the digital data processor (240) and may be incorporated therein. A node communication channel (255) extends from the node communication interface (250) to the device power port (225) for communicating with the external power device (215).

The node power channel (230) includes switching module (265) disposed along the power channel (230) between the bus power port (220) and the device power port (225). The switching module (265) is controllable by the digital data processor (240) to open or close the switching module (265) as required to either connect the power node (205) to the power bus infrastructure (210) when the switching module (265) is closed or to disconnect the power node (205) from the power bus infrastructure (110) when the switch module (265) is opened. A power sensor (295) is optionally disposed along the node power channel (230) between the switching module (265) and the device power port (225) to sense voltage amplitude, current amplitude or power amplitude and communicate a sensor signal to the digital data processor (240).

Each device power port (225) includes a node communication channel (255) in communication with the digital device processor (240) over the communication interface (250) to communicate with the external power device (215). The node communication channel (270) may comprise a one-wire identification interface configured to enable the digital data processor (240) to query a connected external power device (215) for power characteristics information. In some embodiments, a network communication channel (275) extends between the communication interface device (250) and the power bus port (220) when the power bus infrastructure (210) also includes a wire communication infrastructure usable to communicate with other power nodes.

Each external power device (215) includes an external power element (280) connected to the device power port (225) over an external power channel (285). The external power element (280) is a power load, a power source, or an energy storage element, e.g. an electrochemical rechargeable DC battery. The external power device (215) at least includes an external memory module (290) interfaced with the device power port (225) by an external communication channel (270) over an external communication interface device (260). Additionally the external power device may include an external digital data processor (267) in communication with the external memory module (290) and the external communication interface device (260). Typically the external power device memory module (290) stores characteristics of the power element (280) such as device type, operating voltage range, and specific information about power demand and or power availability. The power characteristics may further include instantaneous power demand of a power load, instantaneous input power amplitude of a power source and State of Charge (SoC) and energy storage capacity of a rechargeable DC battery. Other power characteristics may include device ID, power priority setting, high and low current limits, battery charging profile information, use logs, or the like.

According to the present invention the control function of the distributed power network (100) is not centralized but instead is distributed over all of the active power nodes operating on the distributed power network. Moreover an unlimited number of active power nodes can be added to the distributed power network without changing the control aspects of the distributed power network. Thus all of the local controllers (131), (132) operate to collectively and simultaneously control power distribution over the distributed power network (100) even as the configuration of the network changes e.g. by adding or removing power nodes and connecting or disconnecting external power devices or when the instantaneous input power and instantaneous load demand temporarily vary. In one example operating mode a single digital data processor (240) operating on a power node (205) is operable as a master controller with the remaining node processors (240) operating as slave controllers.

Referring to FIG. 1, a distributed power network (100) includes three types of power nodes: input power node (103), bus compatible power node (102), and output power node (101).

Input power node (103) is used to convert the voltage of an input power source input from a non-bus compatible voltage to a bus compatible voltage. Input power node (103) includes local controller (133) which is configured as shown in FIG. 2. Input power node (103) includes device power port (23a) which is electrically interfaced to an external power source. Device power port (23a) for electrically interfacing with an internal power source, and bus power port (23b) for electrically interfacing with the power bus infrastructure (110) and a power channel (153) connecting the device ports (23a) and (23b). Power channel (153) includes controllable switch (113) and input power converter (143). Controllable switch (113) is operable to connect the power channel (153) to or disconnect the power channel from power bus infrastructure (110) to operatively connect or disconnect the external power source connected to device port (23a) to power bus infrastructure (110). Input converter (143) is operable to step up or step down the incoming voltage to a voltage that is compatible with power bus infrastructure (110). Local controller (133) is operable to provide control signals to controllable switch (113) and to input power converter (143) and to communicate with other power nodes (101, 102) to broadcast its state information, the power characteristics of the connected input power source and the instantaneous input power available therefrom.

Local controller (133) of input power node (103) is able to run Maximum Power Point Tracking (MPPT) algorithms usable to convert input power from unstable input power sources (e.g. having time varying input power amplitude) to usable power having a substantially constant voltage that is compatible with the main power bus. The operating voltage range of the input power source can be determined either by communicating with the input power source or may be inferred from sensor signal feedback. Once the input voltage range is determined the local controller (133) provides set points to the DC to DC power converter (143) to match the incoming voltage to the bus compatible operating voltage. Additionally the DC to DC power converter is operable to modulate input current amplitude between substantially zero throughput and full throughput. Thus the local controller (133) is operable to monitor input power amplitude at the power sensor (295) and to modulate power output amplitude by varying current amplitude at the DC to DC power converter (143).

Bus compatible power node (102) is used to any connect external power devices that have a bus compatible operating voltage range to the power bus infrastructure. Bus compatible power node (102) includes a local controller (132) as shown in FIG. 2. Bus compatible power node (102) includes two-way power channel (152) extending from device power port (22a) to bus power port (22b). Bus power port (22b) is electrically interfaced to power bus infrastructure (110). Controllable switch (112) is disposed along power channel (152). Controllable switch (112) is operable to connect or disconnect power channel (152) to power bus infrastructure (110) to operably connect or disconnect an external power device to power bus infrastructure (110). Local controller (132) is operable to provide control signals to controllable switch (112).

Output power node (101) is used to connect a power load or rechargeable battery having a non-bus-compatible operating voltage range to power bus infrastructure (110). Output power node (101) includes local controller (131) shown in FIG. 2. Output power node (101) includes device power port (21a) to electrically interface with an external power load or rechargeable DC battery. Device power port (21a) is electrically connected to bus power port (21b) over power channel (151). Bus power port (21b) electrically interfaces to power bus infrastructure (110). Power channel (151) includes controllable switch (111) and output power converter (143) disposed along power channel (151). The controllable switch (111) and the output power converter (141) are each operably controlled by the local controller (131). Controllable switch (111) is operable to connect the power node to or disconnect the power node from the power bus infrastructure (110) to operatively connect or disconnect the external power load or rechargeable DC battery to power bus infrastructure (110). Output power converter (141) is operable by the local controller (131) to step up or step down the voltage of an instantaneous power signal received from the power bus infrastructure to a voltage that is compatible with the operating voltage range of the connected power load or rechargeable battery. Local controller (131) is operable to provide control signals to controllable switch (111) and to output power converter (141).

The exemplary, non-limiting distributed power network (100) illustrated in FIGS. 1 and 2 includes three power nodes (101), (102), and (103). More generally, a distributed power network according to the present invention includes at least two power nodes and can include unlimited additional power nodes disposed over the available power bus infrastructure and can distribute the input power to the connected power loads. In a preferred embodiment, the power bus infrastructure (110) includes a plurality of bus power port (220) locations where power nodes (200) can be easily connected to or disconnected from the power bus infrastructure (210) at desired locations as needed. By way of general example, the DC power bus infrastructure (210) may extend over a building or a vehicle, e.g. and air or water craft, with bus power ports (220) located at places where a user may need to recharge a DC battery of a smart phone computer or other electronic device or to directly power a DC power load such as a battery operated power tool, radio, instrument or the like. In another example the DC power bus infrastructure (210) may extend over a garment worn by a user wherein the bus power ports (220) are located at places where a user may need to power or recharge the batteries of various user worn devices such as night vision goggles, a heads up helmet display, a portable radio, a GPS navigation device, a watch, a data tracking device, or the like.

4.4 Method of Operation of Exemplary Distributed Power Management Network

In order to practically implement the distributed power network (100) a communications and control scheme is established. The communications method allows any power node (101), (102), (103) to communicate with any other power node over communication network (120). Communication between power nodes is implemented using a peer-to-peer communications method such as UDP or TCP over Ethernet or wireless network, other peer to peer, or other one-to-many network communication techniques. At least two power nodes (e.g., nodes 101, 102, 103) are operably connected to power bus infrastructure (110), one connected to a DC power source, which may be a rechargeable DC battery, and another connected to a DC power load, which may also be a rechargeable DC battery. Otherwise the number of connected nodes is unlimited. Each active power node is electrically interfaced with an external power device operably connected to the power bus infrastructure (210). Each power node queries its connected external power device (215) to determine characteristics of the connected power device. The characteristics at least include a device type and an operating voltage. Other characteristics include peak and average power demand from power loads, available input power from power sources, SoC and storage capacity from rechargeable DC batteries, and the like. Additionally external device characteristics may include priority values usable to assign a power priority and a source priority to each external power device. Each power node (205) further establishes communications with each other power node over communications network (120). The power nodes exchange the characteristics of all connected external power devices (215) over communication network (120) to establish an instantaneous network configuration. An energy management schema program operating on every one of the power node data processors (240) independently determines which external power sources to connect to the power bus infrastructure, which power loads to connect to the power bus infrastructure and which external rechargeable DC batteries to connect to the power bus to charge and or discharge. Additionally each energy management schema instance configures its local power converter (235), if so equipped, to perform any necessary power conversions and if all of energy management instances agree each energy management schema instance takes whatever local action that is required to implement an energy distribution plan. Each power node is capable of implementing at least two forms of control: local control; and network control. Local control does not affect operation of the network and is not affected by the network. Examples of local control include implementation of safeties, minimums, and maximums imposed either by the power node hardware or the local external power device hardware. Network control includes each power node running the same power management schema using the same network configuration information and communicating with other power nodes to share a power distribution plan based on the current network configuration; and implementing that plan when all of the power nodes agree. Thereafter a power node will affect its own operation using the shared information to implement the plan locally.

As a general rule; external power loads are either allocated the full power demanded thereby; when available. However when a power load cannot be allocated the full power allotment, it is disconnected from the power bus infrastructure. As a further general rule: each rechargeable DC battery is selected either as a power source from which stored energy is drawn to power other external power devices, or as an energy storage device in which case the battery is charged. However unlike power loads, rechargeable DC batteries are charged without allocating full charging power. In other words rechargeable batteries are charged with whatever level of power amplitude is available, as long as the available power does not exceed the batteries' maximum charging rate. Thus the energy management schema operates to power as many power loads with the maximum power allocation as can be powered with the available input power and if there is any power left over, the left over power used to charge rechargeable batteries. Additionally when insufficient input power is available to power high priority power loads, power may be discharged from one or more rechargeable DC batteries in order to power the high priority power loads. The process of characterizing the network configuration and distributing power is repeated every 20 to 100 msec. Additionally the process of characterizing the network configuration and distributing power is repeated every time there is a change in the network configuration, such as when an external power device is added to or removed from the distributed power network (100).

In an exemplary implementation, each of a plurality of external power devices (215) is electrically interfaced to a power node (205) and the power node is electrically interfaced to the power bus infrastructure (210). The local data processor (240) of each of the power nodes (205) determines the power characteristics of the local external power device connected thereto.

Each power node communicates with each other power node to share information about its local environment. This includes sharing power characteristics of all the external power devices connected to the power distribution network including, device type, operating voltage, and other specific power characteristics of the external power device as well as sharing characteristics of the power node itself such as power converter current and voltage limits, or the like.

Each local data processor (240) then operates the energy management schema operating thereon to determine a configuration of the distributed power network. The configuration includes local and network wide information about every external power device (215) and every power node (205) such as the instantaneous power demand and operating voltage of all external power loads, the instantaneous power available and operating voltage of all external power sources, the total power required to allocated to network infrastructure to operate electrical components such as data processors (240) and DC to DC power converters (235), the state of charge of all external rechargeable DC batteries, the state of every controllable switch (265) and the set point of every power converter (235).

The local data processor (240) of each power node (215) of distributed power network (100) then run the energy management schema to compute the elements of control for itself as well as the elements of control for all other power nodes on the network (100). Since all power nodes include the same energy management schema and the same information, each power node (205) can determine the elements of control for itself and for each of the other power nodes, and act accordingly.

If any power node does not see any other power node perform the same action that is predicted for that power node, or if the any power node is unable to observe the actions of one or more other power nodes, the power node will shut itself down as a safety. Because all power nodes are able to see all other power nodes' behavior, when one power node shuts down, all power nodes will shut down to a safe mode. This method of watching every other power node's behavior, and responding with a safe condition if the predictions are not implemented, enables a system fail safe.

Additional power nodes can be added to the power bus architecture and power nodes can be removed from the power bus architecture. As power nodes are added to the power bus architecture, they establish communications with other power nodes connected to the power bus architecture and join the distributed power network. Information is exchanged among the new set of power nodes and a new power network configuration is calculated by each power node. Each additional power node enables an additional power source, power load, or battery to be added to the distributed power network. If one or more power nodes leave the distributed power network, the remaining power nodes exchange information and re-configure the power network according to the energy management schema and information about the remaining power nodes and power devices.

4.4.1 Synchronization and Management of Exemplary Power Management Network

Each power node (101), (102), (103) includes a unique Node ID. Node ID may be assigned or may be inherently included as a characteristic of each power node. Exemplary unique Node ID includes media address or serial number assigned to or inherently included as a characteristic of a power node.

Communication among nodes is coordinated using a heartbeat. The heartbeat is a timing signal used to coordinate network communications. The heartbeat signal is generated by a single heartbeat power node. The heartbeat power node is elected from among the power nodes connected to the distributed power network using a voting strategy that is implemented by the power nodes of the power network (100). Exemplary voting strategies include electing the power node with the highest, lowest, or other serial number to create the heartbeat. The heartbeat signal is communicated as a communications message over communication network (120) from the heartbeat power node to each other power nodes of distributed power network (100).

When a power node (e.g., 102) joins distributed power network (100), the new power node connects to communication network (120) and attempts to detect a heartbeat signal. If the new power node does not detect a heartbeat signal, the new node becomes the heartbeat power node and generates a heartbeat signal. If the new node (102) detects a heartbeat, the new node establishes peer-to-peer communication with each of the other power nodes (e.g., 101, 103). The power nodes of distributed power network (100), including the new (102) node and previously connected nodes (101) and (103), implement a voting strategy to select the heartbeat power node. The voting strategy to select the heartbeat power node is repeated when a new node joins the distributed power network and when one or more network power nodes fail to detect a heartbeat signal. Failure to detect a heartbeat may occur, for example, if the currently elected heartbeat power node leaves the distributed power network.

The heartbeat power node causes all other power nodes to synchronize to the heartbeat. Because any power node can be elected to become the heartbeat power node and generate the heartbeat signal, there is complete n for n redundancy in the system.

Each power node will perform a complete power management cycle within 6 heartbeats. Power management sub-tasks are linked to heartbeats within each cycle. Table 1 includes a list of six heartbeats (numbered 0 through 5) with exemplary sub-tasks associated with each heartbeat.

TABLE 1

| Heartbeat | Sub-tasks |
| --- | --- |
| 0 | Reserved: Information is exchanged among power nodes |
| 1 | Each power node performs power network calculations |
| 2 | Connect power sources and batteries to power bus infrastructure in priority order |
| 3 | 3a. Remove extra power from power bus infrastructure in priority order from lowest priority to highest priority<br>3b. Shed loads, if needed, from power bus infrastructure in priority order from lowest priority to highest priority<br>3c. Slow down battery charge in priority order from lowest priority to highest priority |

TABLE 1-continued

| Heartbeat | Sub-tasks |
|---|---|
| 4 | 4a. Connect loads to power bus infrastructure. |
| | 4b. Connect batteries to be charged to power bus infrastructure |
| 5 | Connect unstable power sources to power bus infrastructure if needed |

In general, information is exchanged first, calculations are performed second, power sources are connected next, excess power is removed, and finally power loads and unstable power sources are managed.

4.4.2 Universal Power Node

Figure 3:
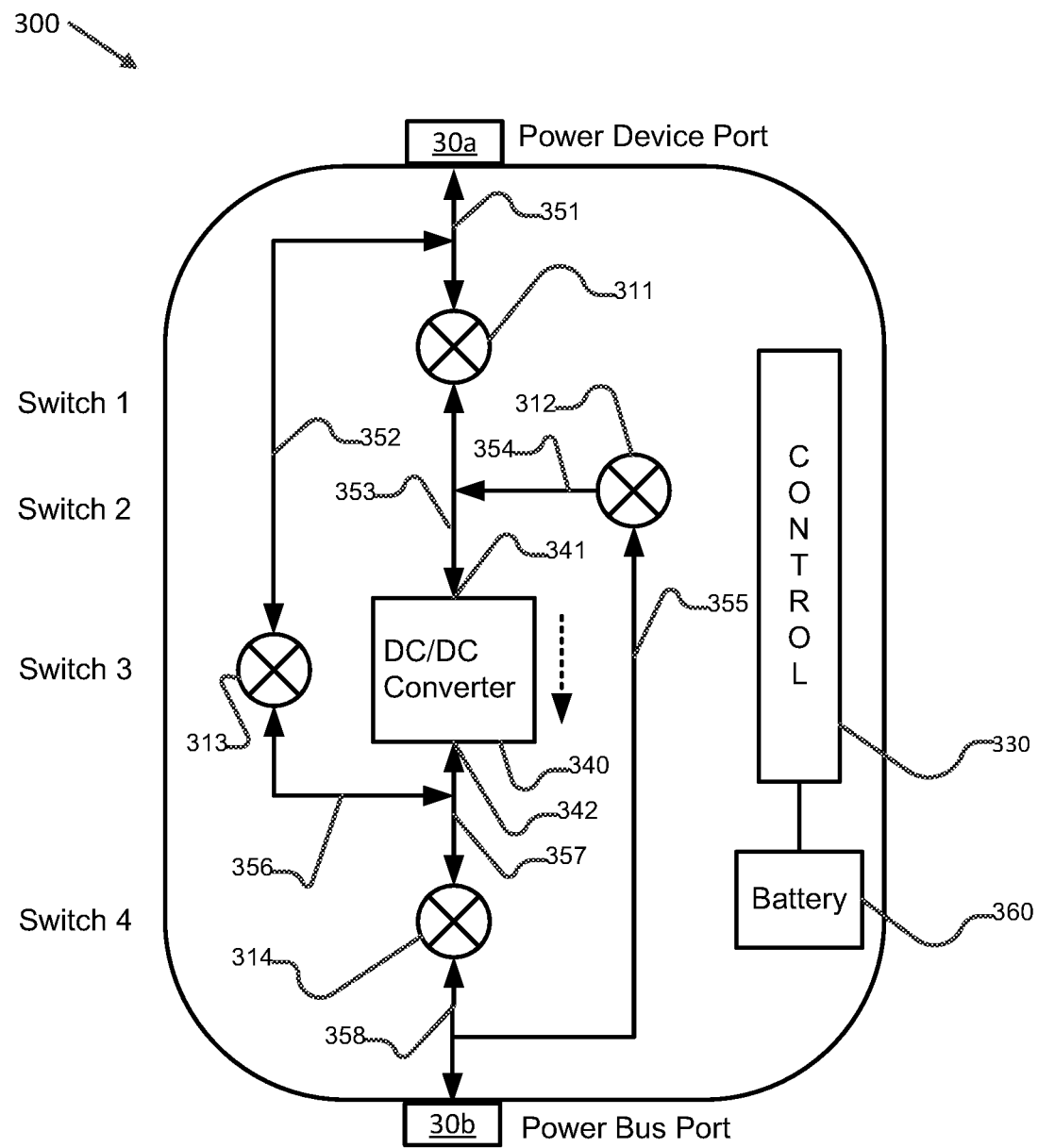
FIG. 3 depicts a schematic view of a non-limiting exemplary distributed power node according to the present invention.

Referring now to FIGS. 2 and 3 a universal power node (300) is usable as any one of an input power node with input voltage conversion, an output power node with output voltage conversion and a bus compatible power node usable as an input power node, or an output power node without voltage conversion. Universal power node (300) includes power converting hardware and power channel circuitry that is configurable to enable universal power node (300) to perform power device connection and power signal control functions of each of the input power node (103), the output power node (101), and the bus compatible power node (102) shown in FIG. 1 and described above. Additionally the universal power node controller (330) is shown schematically in FIG. 2. Thus, a distributed power network can be established, configured, and maintained using multiple instances of universal power node (300), each instance including effectively identical components.

Universal power node (300) includes power device port (30*a*) which is electrically interfaced to an external power device and power bus port (30*b*) which is electrically interfaced to a power bus architecture such as, for example, power bus architecture (110). Power device port (30*a*) includes a reconfigurable power channel, described below that extends between the device power port (30*a*) and the power bus port (30*b*) to enable transfer of power between a connected external power device, e.g. (215), and the power bus infrastructure, e.g. (210). Power device port (30*a*) also includes power node communication channel (255) to enable communications between a digital data processor (240) operating on the universal power node (300) and a connected power device e.g. (215). A second communication channel, e.g. (275) optionally extends from the digital data processor (215) to the bus power port (30*b*) to enable wired communication between universal power node (300) and other power nodes over a wired communication network provided as part of the power bus infrastructure (210). Optionally the universal controller (330) is configured to communicate with other universal controllers using a wireless network interface.

Universal power node (300) includes universal power node controller (330) which is configured as shown in FIG. 2. Universal power node (300) can also include a one-wire identification interface to the device power port (30*a*).

Universal power node (300) can include optional power node battery (360), (247). Power node battery (360) (247) is a rechargeable battery that can be charged when universal power node (300) is operably connected to a power bus architecture, to a power source, or to an external battery, e.g. associated with the power bus infrastructure, capable of providing charge. Power node battery (360) (247) provides power to universal controller (330), enabling the functioning of universal power node (300), when universal power node (300) is operably connected to a power bus architecture without external power supply, i.e. when the power bus architecture is not powered and when power device port (30*a*) is connected to a power load or to an external battery that does not supply power to universal power node, e.g., an insufficiently charged external battery.

Universal power node (300) further includes a controllable DC to DC voltage or power converter (340) disposed along a reconfigurable power channel that extends between power device port (30*a*) and power bus port (30*b*). In the present exemplary, non-limiting, embodiment, DC to DC power converter (340) is a one-way DC to DC power converter having an input side (341) and an output side (342). An input power signal enters power converter (340) at input side (341). An output power signal exits power converter (340) at output side (342). The power converter (340) can be configured to convert the voltage of an input power signal to a different output voltage of an output power signal and to modulate the current amplitude of the output power signal. The DC to DC power conversion is controlled by the controller (330) which determines the input power signal voltage either by communicating the a connected power source or determining instantaneous input voltage from a sensor signal from the power sensor (295).

Universal power node (300) includes power control circuitry comprising four controllable switches (311), (312), (313), and (314). Universal controller (330) is in communication with each controllable switch and is operable to send control signals to each switch. In an exemplary embodiment, controllable switches (311), (312), (313), and (314) are single pole single throw type. Alternatively, the switches can be implemented with multiple throws or multiple poles. Each controllable switch (311), (312), (313), and (314) can be toggled to an open (off) position, to prevent current flow across the switch or toggled to a closed (on) position to allow current flow across the switch. The configuration of each switch is responsive to control signals received from the universal controller.

Universal power node (300) power control circuitry includes a reconfigurable power channel that includes multiple power channels. Two-way (bidirectional) power channels are indicated by solid double-headed arrows and one-way power channels are indicated by solid single headed arrows. Power device port (30*a*), power bus port (30*b*), switches (311), (312), (313), (314) and power converter (340) are interconnected by the reconfigurable power channel. Universal power node (300) power control circuitry is configurable to transfer power signals between power device port (30*a*) and power bus port (30*b*) in either direction (i.e., from power device port (30*a*) to power bus port (30*b*) or from bus port (30*b*) to power device port (30*a*)) with or without power conversion by configuring the state of each of the controllable switches (311), (312), (313), (314) and the state of the DC to DC power converter (340) in patterns of open and closed positions which are set forth in Table 2.

Universal power node (300) can be configured as an input power node, by closing switches (311) and (314) and opening switches (312) and (313). In this case an input power signal received from an external power source connected to the device power port (30*a*) is directed to the input side (341) of the DC to DC power converter (340). The DC to DC power converter is configured to perform whatever voltage conversion is required to convert the input power signal to a bus compatible voltage and the converted input power signal passed to the bus power port (30*b*) to the power bus infrastructure. Additionally if needed, the DC to DC power converter can be operated to modulate the current amplitude of the input power signal being voltage converted.

Universal power node (300) can be configured to a bus-compatible power node, by opening switches (311) and (312) and closing switches (313) and (314). In this case an input power signal received from an external power source connected to the device power port (30a) is directed to the power bus port (30b) without power conversion. Likewise when an external power load or rechargeable DC battery is connected to the device power port (30a) an output power signal received from the power bus infrastructure (210) is directed to device power port (30a) without power conversion.

Universal power node (300) can be configured as an output power node, by opening switches (311) and (314) and closing switches (312) and (313). In this case an output power signal received from the power bus infrastructure (210) is directed to the input side (341) of the DC to DC power converter. The DC to DC power converter is configured to perform whatever voltage conversion is required to convert the output power signal to a voltage that is compatible with powering a non-bus compatible load or rechargeable DC battery connected to the device power port (30a). Additionally if needed, the DC to DC power converter can be operated to module current amplitude of the output power signal being voltage converted.

Table 2 includes configuration of the controllable switches and of power converter (340) that corresponding universal power node configuration.

TABLE 2

| Universal power node configuration | Power control element | Configuration |
|---|---|---|
| Input Node | Switch 1 (311) | Closed |
| | Switch 2 (312) | Open |
| | Switch 3 (313) | Open |
| | Switch 4 (314) | Closed |
| | Power converter (340) | On |
| Bus compatible node | Switch 1 (311) | Open |
| | Switch 2 (312) | Open |
| | Switch 3 (313) | Closed |
| | Switch 4 (314) | Closed |
| | Power converter (340) | Off |
| Output Node | Switch 1 (311) | Open |
| | Switch 2 (312) | Closed |
| | Switch 3 (313) | Closed |
| | Switch 4 (314) | Open |
| | Power converter (340) | On |

Figure 4:
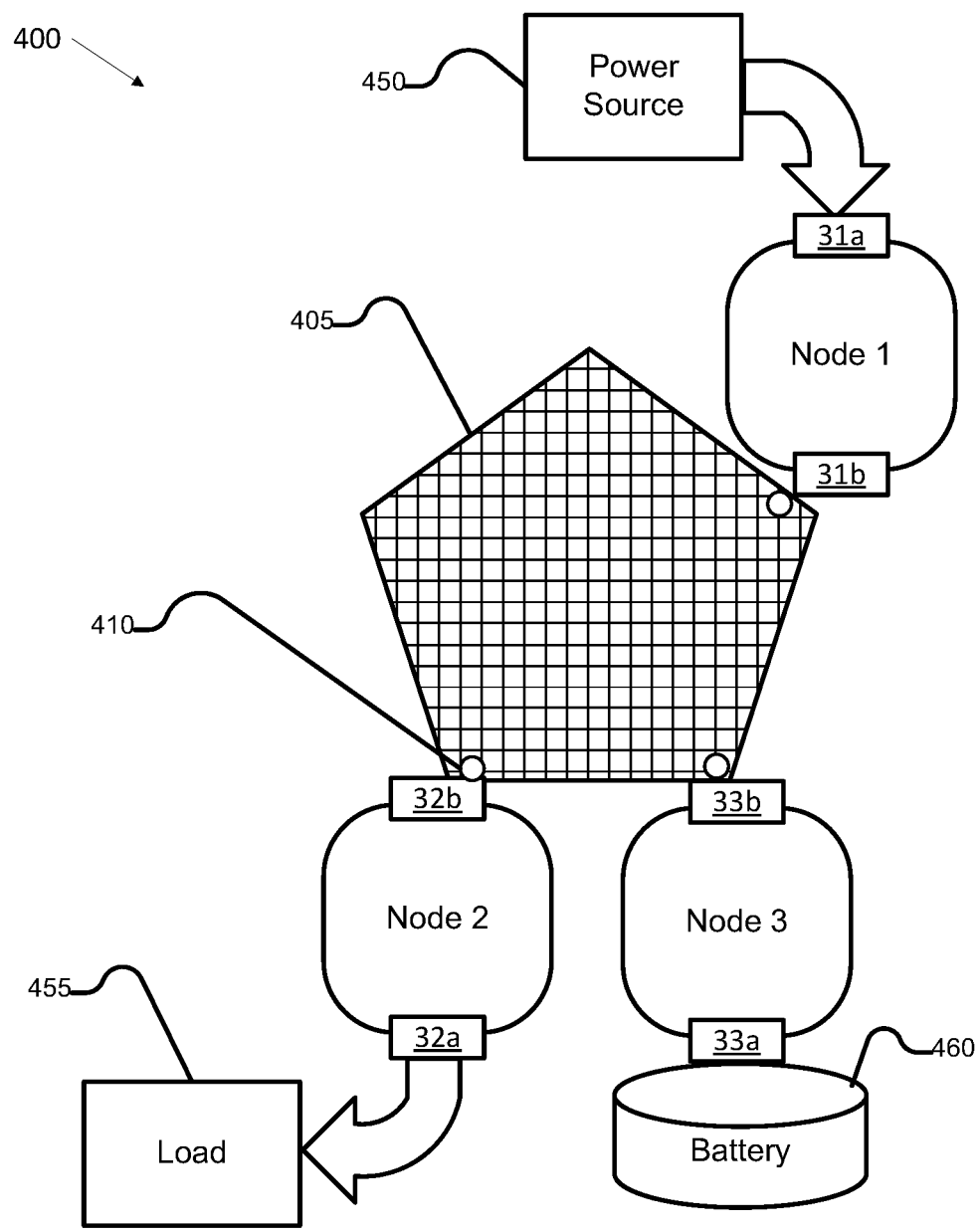
FIG. 4 depicts a schematic view of a non-limiting exemplary configuration of a distributed power network according to the present invention.

4.4.3 Exemplary Distributed Power Management Network Comprising Universal Power Nodes Referring to FIG. 4, an exemplary distributed power management network (400) comprising multiple universal power nodes (1), (2), (3) is illustrated. Each power node (1, 2, 3) may comprise any one of the nodes (101, 102, 103) or the universal node (300) described above. Each node (1, 2, 3) includes node control elements substantially as shown in FIG. 2 and or as described above.

Figure 5:
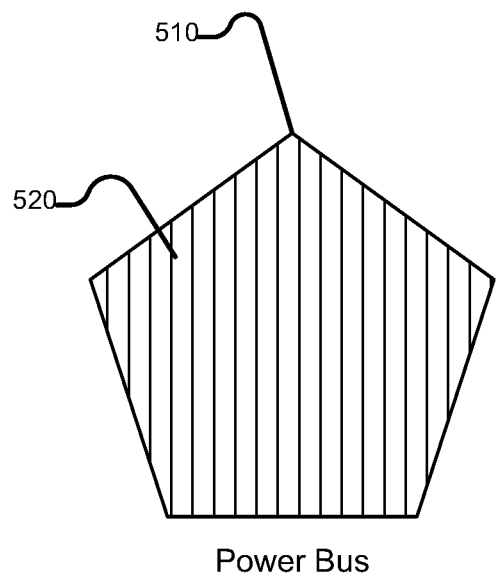
FIG. 5 depicts a schematic view of a non-limiting exemplary power bus according to the present invention.
Figure 6:
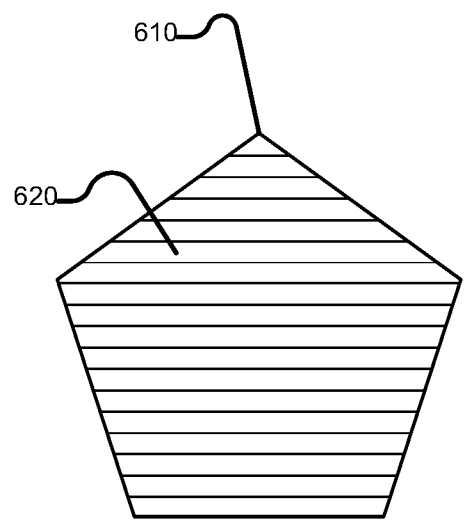
FIG. 6 depicts a schematic view of a non-limiting exemplary communication bus according to the present invention.
Figure 7:
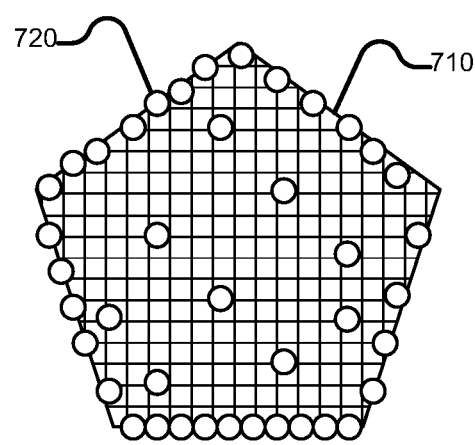
FIG. 7 depicts a schematic view of a non-limiting exemplary combined power and communication bus according to the present invention.

Referring to FIG. 5-7, combined power and communication infrastructure (710) includes a power bus infrastructure (510) and a wired communication network (610) disposed over a region. The power bus infrastructure (510) includes a plurality of conductive pathways (520) configured to carry electric current between a plurality of node points (720) wherein each node point (720) provides a location where any power bus node such as (21b, 22b, 23b, 30b 220) can be electrically interfaced to the power bus infrastructure (510) at a node point (720). More specifically the power bus infrastructure (510) is configured to electrically interconnect each node point (720) with each other node point (720) with a power channel. The power channel (520) may comprise a pair or pairs of conductive elements, e.g. a positive plate and negative plate, or a grid of paired wires, or a loop of paired wires, or the like.

Similarly, the wired communication network (610) includes a plurality of conductive pathways (620) configured to carry a communication signal between node points (720) wherein each node point (720) provides a location where any power bus node such as (21b, 22b, 23b, 30b, 220) can be interfaced to the wired communication bus infrastructure (610) at a node point (720). More specifically the wired communication bus infrastructure (610) is configured to interconnect each node point (720) with each other node point (720) with a communication channel. The communication channel may comprise a pair or pairs of conductive elements, (620) e.g. a positive plate and negative plate, or a grid of paired wires, or a loop of paired wires, or the like.

In an embodiment power bus infrastructure (510) and wire communication network (610) of combined power and communication infrastructure (710) include separate conductive pathways implemented with separate medium, similar to power bus infrastructure (110) and communication network (120) of distributed power network (100). In an embodiment, power bus infrastructure (510) and communication network (610) are combined using existing technologies such as power over Ethernet, Broadband Powerline Communications, e-textile systems or the like comprising power and communication busses, or wireless power.

Referring now to FIG. 4, a distributed power network (405) includes multiple universal power nodes (1, 2, 3) each having its bus power port (31b, 32b, 32c) connected to a combined power bus infrastructure and wired network infrastructure (405) at a different node point (410). Universal power node (1) includes power device port (31a) connected a power source (450). Universal power node (2) includes power device port (32a) connected to a power load (455). Universal power node (3) includes power device port (33a) connected to a rechargeable DC battery (460).

When power network (400) is configured and operational, each universal power node (1), (2), and (3) communicates with each other universal power node in a peer-to-peer network configuration over communication network infrastructure (610). Additionally, each universal power node (1), (2), and (3) is operable to provide power to, or to receive power from, the power bus architecture (510).

Distributed power network (400) includes multiple power devices. Each power node (1), (2) and (3) is operably to communicate with the external power device connected thereto, to determine power characteristics of the external power device, to share the power characteristics of the external power device with other power nodes, to receive power characteristics of external power devices connected to every other power node, and to determine an operating mode for each power node in the distributed power network. Thereafter if all the power nodes are in agreement, each power node is operable to configure itself in a desired operating mode or state and then to connect its external power device to the power bus infrastructure or disconnect its external power device from the power bus infrastructure to distribute power to or receive power form the power bus infrastructure.

Power source (450) can include any source of DC power, for example a solar blanket or fuel cell, a vehicle battery or the like, a wind, water or mechanical driven power generator, an AC power grid source driving an external DC power convertor, or the like as long as the input DC power voltage, if not compatible with bus voltage, can be converted to a bus compatible voltage by the DC to DC power converter operating on node (1). Power load (455) can be connected to the power bus infrastructure to receive power therefrom as long as the bus compatible voltage can converted to an operating voltage of the power load (455) by the output DC to DC power converter operating on node (2). Typical power loads (455) include a DC power device such as most portable devices, computers, audio and telecommunications equipment, instruments, medical devices, power tools, DC lighting, vehicle power loads, or the like.

Battery (460) can be connected to the power bus infrastructure to receive power therefrom or deliver power thereto as long as the DC to DC power converter operating on node (3) can make the desired DC to DC voltage conversion to exchange power between the battery and the power bus infrastructure. The battery (460) is a rechargeable DC battery that can be discharged to the power bus infrastructure as a power source or charged by the power bus infrastructure when unallocated power is available therefrom.

Each universal power node (1), (2), and (3) has a unique Node ID. In an embodiment, Node ID includes universal power node serial number. Alternatively, or in addition, Node ID can include universal power node physical address.

4.4.4 Initializing and Operating a Distributed Power Management Network Comprising Universal Power Nodes Referring to FIGS. 2 and 4, an exemplary, non-limiting, discussion of distributed power network initialization and operation is presented herein below. A distributed power network comprising power nodes, e.g. distributed power network (100) or (400), is initially configured by interfacing two or more power nodes, e.g., (101), (102), (103), (1), (2), (3), to a power bus infrastructure (110) or combined power and communication architecture (405). The distributed power nodes do not initially receive power from or provide power to the power bus architecture (405). The distributed power nodes are not initially in communication with each other.

In the case of the universal power node embodiment (300) an internal battery (360) is usable to power the controller (330) to preform initializing steps. If no internal battery is provided, the power bus infrastructure (110) may include a DC battery (180) operating at a bus compatible voltage to provide initial power to connected power nodes to operate the controllers thereof to establish communications with other distributed power nodes to detect a heartbeat signal and to synchronize with the subtasks listed in TABLE 1. In this case each power node that does not include an internal battery to power its controller is configured to draw power from the power bus infrastructure to initialize operation of the power node.

In another operating mode, power sensors (295) are operable to detect input power available from a connected external power source or rechargeable DC battery and to use the available input power to operate the node controller to establish communications with other distributed power nodes to detect a heartbeat signal and to synchronize with the subtasks listed in TABLE 1. When no heartbeat is detected, the node may establish the heartbeat and configure itself to deliver the available input power to power bus infrastructure in an attempt to power other power node controllers and establish a distributed power network.

In an initial state of distributed power network (400), universal power nodes (1), (2), and (3) are electrically interfaced to combined power bus architecture (405) but are not initially in communication with each other. Universal power nodes (1) and (3) may be electrically interfaced with external power devices, e.g., power source (450) and battery (460) capable of providing power to the power nodes, and optionally using internal battery power, can each be operated to communicate with an external power device connected thereto and determine if input power is available therefrom to power the power node without drawing power from the power bus infrastructure.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications e.g. in a distributed DC power network, those skilled in the art will recognize that its usefulness is not limited thereto and that the present invention can be beneficially utilized in any number of environments and implementations where it is desirable to distribute AC or DC power received from one or more power sources to a power bus infrastructure distributed over a region in order to deliver power to power loads and rechargeable batteries distributed over the region. Accordingly, the claims set forth below should be construed in view of the full breadth and spirit of the invention as disclosed herein.

What is claimed is:

1. A reconfigurable power channel extending between a first device power port and a second device power port comprising:
  a logic controller that includes programmable logic elements and an associated memory module operating an energy management schema program;
  a plurality of electrical control devices including a one-way DC to DC power converter and a plurality of controllable switches each controlled by the logic controller, wherein the one-way DC to DC power converter includes an input side for receiving input DC power and an output side from which output DC power is discharged;
  an input power converting channel comprising a first conductive pathway that extends between the first device power port and the input side; and a second conductive pathway, that extends between the output side and the second device power port;
  an output power converting channel comprising a third conductive pathway, that extends between the second device power port and the input side, and a fourth conductive pathway that extends between the output side and the first device power port; and
  a non-converting power channel comprising a fifth conductive path pathway that extends between the first device power port and the second device power port.

2. The reconfigurable power channel of claim 1 wherein the fifth conductive pathway comprises each of the fourth conductive pathway and the second conductive pathway.

3. The reconfigurable power channel of claim 1, wherein:
  the input power converting channel includes a first controllable switch disposed along the first conductive pathway and a fourth controllable switch disposed along the second conductive pathway;
  the output power converting channel includes a second controllable switch disposed along the third conductive pathway and a third controllable switch disposed along the fourth conductive pathway; and
  the non-power converting channel includes the third controllable switch disposed along the fifth conductive pathway.

4. The reconfigurable power channel of claim 1 wherein the logic controller is configured to open and close each controllable switch independently of the other controllable switches and to configure the reconfigurable power channel as any one of, the input power converting channel, the output power conversion channel, and the non-power converting channel.

5. The reconfigurable power channel of claim 1 wherein the logic controller is configured to deliver control signals to the one-way DC to DC power converter, wherein the control signals correspond with establishing a power conversion of a DC input power received at the input side wherein the power conversion comprises one of a DC to DC voltage conversion and a DC current amplitude modulation.

6. The reconfigurable power channel of claim 5 wherein the DC to DC voltage conversion includes one of increasing and decreasing a DC voltage amplitude of the DC input power received at the input side.

7. The reconfigurable power channel of claim 5 wherein the DC current amplitude modulation includes modulating a current amplitude of the DC input power received at the input side between substantially zero current throughput and a maximum current throughput.

8. The reconfigurable power channel of claim 1 further comprising a DC battery (360) electrically interfaced with the logic controller for powering elements of the reconfigurable power channel.

9. The reconfigurable power channel of claim 1 further comprising a power sensor in communication with the logic controller disposed to sense any one of, a power amplitude, a voltage amplitude and a current amplitude, of DC power proximate to the first device power port.

10. The reconfigurable power channel of claim 1 further comprising a node communication interface and a node communication channel disposed between, the logic controller and the first device power port wherein the logic controller is configured to determine, from an external DC power device interfaced with the first device power port, operating characteristics thereof.

11. The reconfigurable power channel of claim 1 wherein the second device power port is electrically interfaced with a DC power bus infrastructure.

12. The reconfigurable power channel of claim 11 further comprising a plurality substantially identical reconfigurable power channel devices each electrically interfaced with the DC power bus infrastructure wherein the DC power bus infrastructure operates at a DC bus voltage.

13. The reconfigurable power channel of claim 12 wherein each of the plurality of identical reconfigurable power channel devices includes a network communication interface device operated by the logic controller to establish a communication channel between the logic controller of each reconfigurable power channel and the logic controller of one or more other of the plurality of reconfigurable power channel devices.

14. The reconfigurable power channel of claim 12 wherein each of the plurality of substantially identical reconfigurable power channel devices includes an external DC power device electrically interfaced with the first device power port thereof, wherein each of the plurality of substantially identical reconfigurable power channel devices is self-configured to, one of:
receive input power, from the DC power bus infrastructure, and deliver the input power received from the DC power bus infrastructure to the external DC power device electrically interfaced with the first device power port corresponding therewith; and,
receive input power, from the external DC power device electrically interfaced with the first device power port corresponding therewith and deliver the input power received from the external DC power device electrically interfaced with the first device power port corresponding therewith, to the DC power bus infrastructure.

15. An operating method for configuring a reconfigurable power channel that includes a logic controller operating an energy management schema program, a first device power port electrically interfaced with an external DC power device, a second device power port electrically interfaced with a DC power bus and a one-way DC to DC power converter having an input side and an output side, the method comprising the steps of:
determining, by the logic controller, a device type and an operating voltage of the external DC power device electrically interfaced with the first device power port, wherein the device type is one of a power source and a power load; and
determining, by the logic controller, an operating voltage of the DC power bus,
wherein when the operating voltage of the external DC power device is compatible with the operating voltage of the DC power bus, the logic controller configures the reconfigurable power channel as a non-converting power channel by operating one or more controllable switches to connect the first device power port with the second device power port,
wherein when the operating voltage of the external DC power device is not compatible with the operating voltage of the DC power bus, and the first external DC power device is a power source, the logic controller configures the reconfigurable power channel as an input power converting channel by operating one or more controllable switches to connect the first device power port to the input side and to connect the second device power port to the output side, and by configuring the one-way DC to DC power converter to match an output voltage amplitude from the output side with the operating voltage of the DC power bus, and
wherein when the operating voltage of the first external DC power device is not compatible with the operating voltage of the DC power bus, and the first external DC power device is a power load, the logic controller configures the reconfigurable power channel as an output power converting channel by operating one or more controllable switches to connect the first device power port to the output side and to connect the second device power port to the input side, and by configuring the one-way DC to DC power converter to match an output voltage amplitude from the output side with the operating voltage of the first external DC power device.

16. The operating method of claim 15 wherein the device type includes a rechargeable DC battery further comprising the steps of:
determining, by the logic controller, a state of charge of the rechargeable DC battery; and,
designating, by the logic controller, whether to treat the rechargeable DC battery as a power source or a power load.

* * * * *